July 2, 1963     H. OSTERHOUDT     3,096,084

HELPER SPRING ASSEMBLY FOR SHOCK ABSORBERS

Filed Dec. 10, 1962

INVENTOR.
HARRY OSTERHOUDT
BY
Cullen, Sloman & Cantor
ATTORNEYS

United States Patent Office 3,096,084
Patented July 2, 1963

3,096,084
HELPER SPRING ASSEMBLY FOR
SHOCK ABSORBERS
Harry Osterhoudt, Detroit, Mich., assignor to Perfection Automotive Products Corporation, Detroit, Mich., a corporation of Michigan
Filed Dec. 10, 1962, Ser. No. 243,381
4 Claims. (Cl. 267—8)

The present invention relates to a helper spring assembly for shock absorbers, and more particularly to a novel structure for mounting and securing a helper spring on a conventional shock absorber.

It is the object of the present invention to provide a novel construction for facilitating mounting of a helper spring upon a shock absorber assembly and with means for adjustably mounting and anchoring the spring thereover in compression.

It is another object to provide a novel helper spring for shock absorbers which not only anchors the spring ends in compression upon the shock absorber assembly, but also maintains a rattle-proof relationship therebetween.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 1:
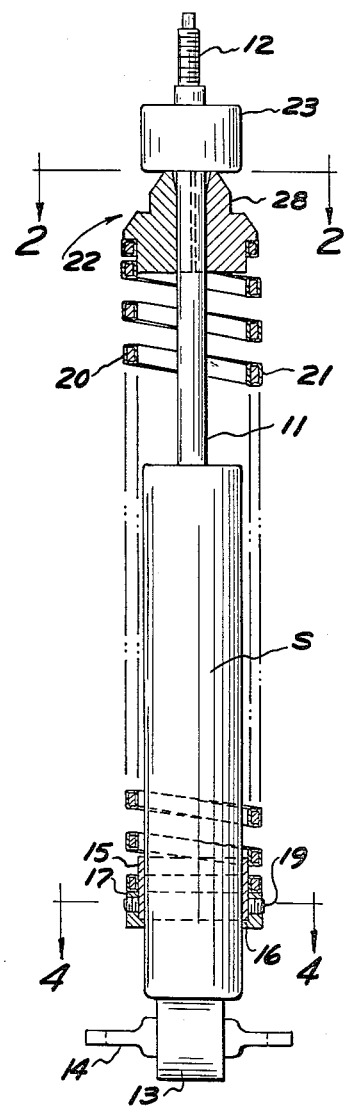
FIG. 1 is an elevational view of a shock absorber with the present helper spring assembly mounted thereover and shown in longitudinal section.

Referring to the drawing, a conventional shock absorber is shown in FIG. 1 which includes body S from which projects a longitudinally reciprocal and axial rod 11 whose outer threaded end 12 is adapted for adjustable securing to a portion of a vehicle frame.

The opposite end of body S has fixedly secured thereto bracket member 13 which mounts transverse assembly 14 by which the shock absorber is connected to the wheel assembly of the vehicle.

The present invention is primarily directed to the helper spring assembly and the means by which the spring is axially mounted over the shock absorber with means for anchoring the spring ends in compression.

A first spring stop 17 of annular form is loosely mounted around body S and includes an internal annular flange 16 which engages body S, FIG. 1. A flexible metallic split sleeve 15 is loosely mounted around and upon body S and is positioned within spring stop 17 so that one end of the sleeve operatively bears against flange 16.

Figure 4:
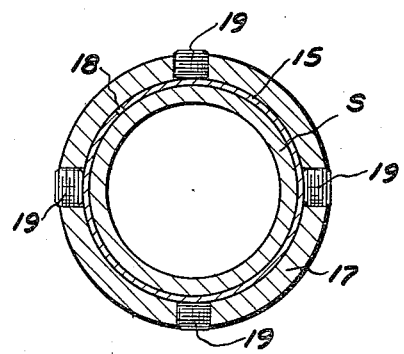
FIG. 4 is a section taken on line 4—4 of FIG. 1, on an increased scale.

As shown in FIG. 4, the flexible metallic sleeve 15 is split as at 18 and thus is adapted to accommodate itself to the diameter of body S of the shock absorber. A series of pairs of diametrically opposed radially extending set screws 19 are threaded through stop 17 for frictional and operative compressive engagement with flexible sleeve 15. This is for the purpose of frictionally and compressively engaging the body of the said shock absorber and for anchoring first stop 17 in position, FIG. 1.

In conventional shock absorbers, the body contains hydraulic fluid and is of such gauge that there would be a likelihood, absent the sleeve 15, that the set screws might damage or perforate its wall. Accordingly, sleeve 15 performs two functions:

Protects the body of the shock absorber against physical damage from the anchoring set screws 19 of first stop 17, and additionally provides a spacer to cooperatively receive one end of coil spring 20 which is projected over the shock absorber. Said one end is retainingly engaged by first stop 17 anchoring the same in the position shown in FIG. 1.

A suitable plastic or rubber coating 21 is applied to all surface portions of spring 20 in order to improve its anti-rattle characteristic.

The second spring stop generally indicated at 22 is loosely positioned over rod 11 and is adapted to operatively and retainingly engage the opposite end of said spring with the desired amount of compression depending upon the adjustment of threaded fastener 23 which is positioned over the threaded end 12 of rod 11 forming a part of the shock absorber.

Figure 2:
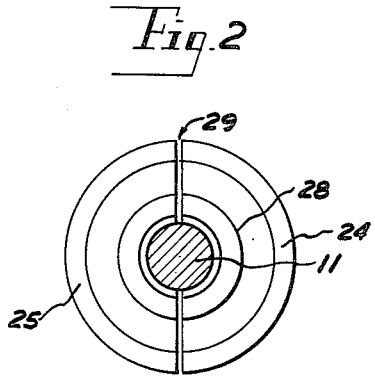
FIG. 2 is a section taken on line 2—2 of FIG. 1, on an slightly increased scale.
Figure 3:
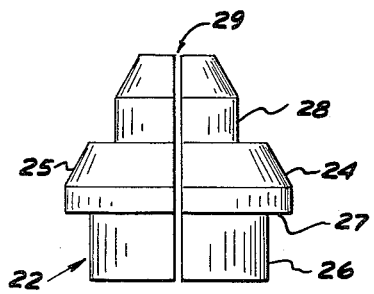
FIG. 3 is an elevational view of the split adjustable stop for the spring in FIG. 1.

The second stop 22 consists of a pair of opposed symmetrical elements split at 29, FIGS. 1, 2 and 3 in which are assembled an opposed relation, being centrally apertured to loosely position around rod 11.

As best shown in FIG. 3, said second stop includes the semi-circular shoulder portions 24 and 25 of symmetrical construction which terminate at their lower ends in semi-circular sleeve elements 26 of reduced diameter and which are adapted to cooperatively nest down into the upper end of coil spring 20 for anchoring and spacing the same radially with respect to rod 11 and for further aiding in the centralizing of the said spring with respect to the shock absorber.

The formation of sleeve elements 26 of reduced diameter thus defines with respect to shoulders 24—25 the stopledge 27 which operatively retains the upper end of the spring. Upper portions of shoulders 24 terminate in the symmetrical opposed semi-cylindrical elements 28 completing the second stop assembly. End portions 28 are operatively engaged by adjustable fastener 23 threaded over rod 11 and provides the means by which adjustable compression may be achieved within coil spring 20 between stops 17 and 22.

One advantage of the split construction for the second adjustable stop 22 is that since the radius of shoulder members 24—25 necessarily is larger than the internal radius of the coil spring, in order to assemble the spring over the shock absorber from the rod end, all that is necessary is to merely loosen fastener 23 and temporarily remove split elements 24—25.

At the same time, the exterior diameter of fastener 23 is less than the internal diameter of coil spring 20. Thus it is not necessary to remove said fastener in order to assemble the spring over the rod end of the shock absorber. The construction at 13 and 14, of course, prevents the spring from being assembled from the opposite end of the shock absorber.

In the present illustrative embodiment, coil spring 20 is coated preferably with a plastic substance such as polyethelene, or rubber, or synthetic rubber, or the like to prevent metal to metal contact for the purpose of improving the anti-rattle characteristics of the helper spring with respect to the shock absorber.

The present construction also provides a means by which the spring is axially mounted over the shock absorber, and is properly spaced symmetrically around the shock absorber again to prevent rattling conditions. The spring does not engage the shock absorber itself, but is spaced therefrom due to the construction of the first and second stops 17 and 22 as well as mounting sleeve 15 hereinabove described with respect to FIG. 1.

Having described my invention, reference should now be had to the following claims.

I claim:
1. In a helper spring assembly for a shock absorber including body with a reciprocal rod projecting axially therefrom; the improvement comprising an annular first spring stop loosely mounted around said body including an internal annular flange engaging the body, a flexible metallic split sleeve mounted around and upon said body within said first spring stop and bearing against its internal flange, a series of spaced fasteners threaded radially through said first stop operatively and frictioinally engaging said sleeve to adjustably anchor said first stop on said body, a coiled spring loosely mounted longitudinally over said body and rod and at one end extending around said sleeve and bearing against said first stop, an apertured axially split second spring stop comprising a pair of opposed symmetrical elements mounted over the end of said rod retainingly and compressively engaging the other end of said spring, spacer sleeve elements of reduced radius axially projecting from said symmetrical elements down into said other end of said spring, and an adjustable fastener threaded upon said rod operatively bearing against said second spring stop for regulating the compression of said spring and for centralizing and anchoring the same relative to said shock absorber body and rod.

2. In the helper spring assembly for shock absorbers defined in claim 1, said fasteners consisting of a plurality of pairs of spaced diametrically opposed set screws nested within said first stop.

3. In the helper spring assembly for shock absorbers defined in claim 1, said second spring stop being of a diameter greater than the internal diameter of the coils of said spring, and said fastener on said rod being of a diameter less than the internal diameter of said coils facilitating assembly of the spring over said latter fastener and shock absorber body with said second stop temporarily removed.

4. The helper spring assembly for shock absorbers defined in claim 1, and a non-metallic coating over substantially all surfaces of said spring.

References Cited in the file of this patent
UNITED STATES PATENTS

| | | |
|---|---|---|
| 2,472,307 | Nagel | June 7, 1949 |
| 2,874,955 | McIntyre et al. | Feb. 24, 1959 |
| 2,988,379 | Walker | June 13, 1961 |